Patented Dec. 2, 1924.

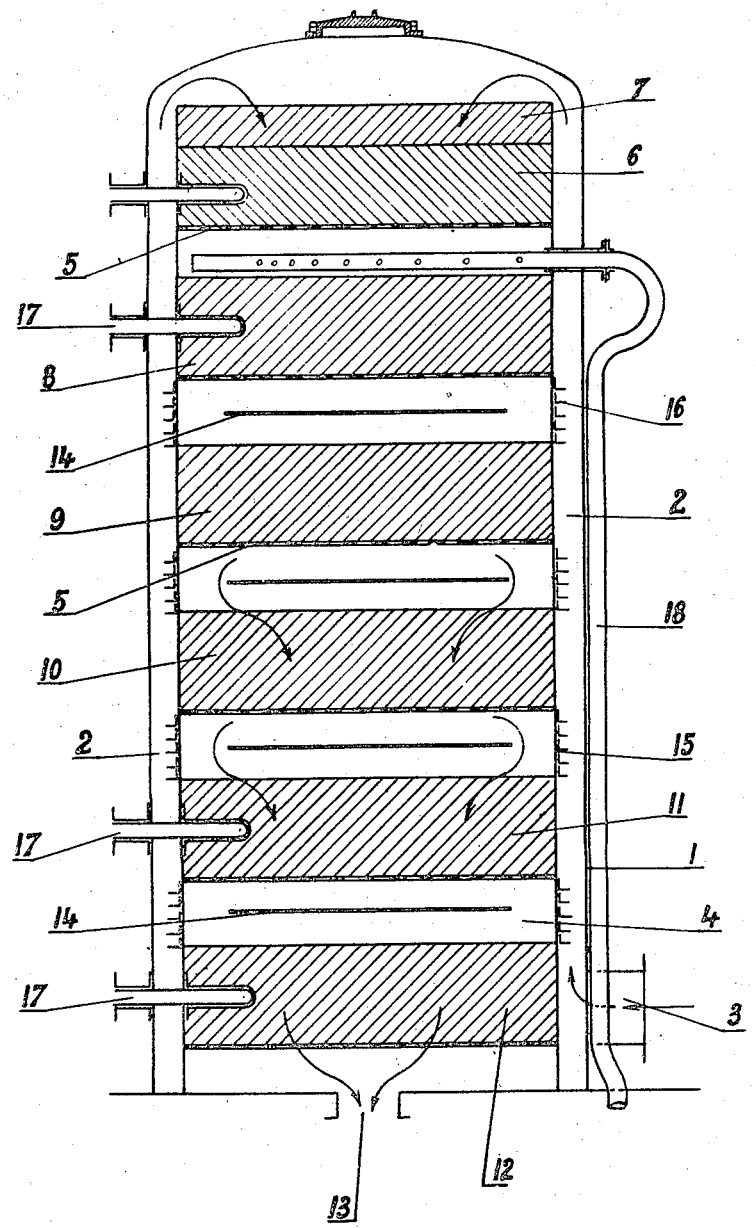

1,518,043

UNITED STATES PATENT OFFICE.

PAUL AUDIANNE AND GABRIEL BACHALARD, OF PARIS, FRANCE, ASSIGNORS TO COMPAGNIE NATIONALE DE MATIERES COLORANTES ET MANUFACTURES DE PRODUITS CHIMIQUES DU NORD REUNIES, ETABLISSEMENTS KUHLMANN, OF PARIS, FRANCE, A CORPORATION OF FRANCE.

PROCESS FOR THE PREPARATION OF SULPHURIC ANHYDRIDE BY CONTACT BY MEANS OF VANADIUM SALTS.

Application filed November 19, 1923. Serial No. 675,722.

*To all whom it may concern:*

Be it known that we, PAUL AUDIANNE and GABRIEL BACHALARD, both citizens of the French Republic, and residing at 117 Boulevard Haussmann, Paris, France, have invented certain new and useful Processes for the Preparation of Sulphuric Anhydride by Contact by Means of Vanadium Salts.

In the preparation of sulphuric anhydride by contact, it has already been proposed to replace platinum which is a very expensive catalyst by a vanadium salt which is much cheaper. But the results from this method have not proved favourable and the process has not come into widespread use on a manufacturing scale, owing to the reduced output obtained by reason of the relatively small activity of the catalyst.

The present invention relates to a process of preparation of sulphuric anhydride on the contact principle by the use of vanadium salts as catalysts, and it offers a yield that is quite comparable to what is obtained by the platinum process.

For this purpose the catalytic mass is formed of grains of inert and porous material, such as pumice stone, kieselguhr, etc. impregnated with a solution of a dried vanadium salt. This mass is distributed in a certain number of separate layers, successively traversed by the gases. In each of the layers the size of the grains is uniform, but this size decreases from one layer to the other, the largest grains with dimensions not exceeding 5 mm., form the first layer encountered by the gases, while the last layer encountered by the gases is formed of the finest grains, of the order of 2 mm. dimensions.

The amount of vanadium salt solution used for impregnating the base corresponds to a weight of 50 to 55 kgs. of vanadium anhydride per cubic meter by apparent volume of the mass, the finest grains containing a maximum of vanadium anhydride and the largest grains the minimum.

Experience shows that the results obtained may be improved in some cases by adding to the said catalytic mass a small quantity of metallic oxides (iron, tungsten, molybdenum, etc.) in the proportion of 2 to 3 per cent of the weight of the vanadic oxide. In like manner it may be preferable to slightly moisten the gaseous mass formed by the mixture of sulphurous anhydride and air before passing the same over the catalytic mass.

Since the vanadium salts have a relatively smaller activity than platinum, it is preferable to start the reaction by passing the gases, before attaining the layers of the vanadium catalyst, over a layer of platinum catalyst. Inasmuch as the amount of platinum thus used will be only about 1/15 of what would be employed were the catalysis to be effected solely with platinum, our said process will still be much more economical than the known platinum processes, such for instance as the Grillo process.

The process may be carried out in an apparatus closely resembling the catalyzing chamber employed in the Grillo process.

A constructional form of our apparatus is shown by way of example in sectional elevation in the appended drawing.

The apparatus essentially comprises a vertical cylindrical chamber 1 surrounded by an annular space 2 for the inlet of gas (mixture of sulphurous anhydride and air) which enters the lower part through the conduit 3. Within the central chamber 4 are disposed various grids 5 holding the several layers of catalyst. The upper grid contains a mass of platinized substance 6, and upon the latter is placed a layer of an inert substance 7 which is granulated but is not impregnated; this latter forms a filter and retains any dust particles remaining in the gas after they have been purified by the known methods. The other grids contain catalytic masses 8, 9, 10, 11, 12 consisting of vanadium salts as above mentioned. The size of the grains for each grid is so chosen as to obtain at each point the maximum yield at the temperature of any given layer.

The resulting sulphuric anhydride is discharged at the bottom through the conduit 13.

A cast metal disc 14 is disposed between the several tiers so as to oblige the gas to come into contact with the wall 15 situated between the annular space 2 and the central chamber 4, and the gas is thus cooled by the stream of gas flowing in the said space. This cooling is further augmented by providing the wall 15 with outwardly extending cooling flanges 16.

The pyrometers 17 are suitably spaced apart within the catalytic masses.

A conduit 18 is disposed at the exterior of the chamber 1 for the admission at will of a certain amount of moistened gas to a point above the first layer of the vanadium salt catalyst 8.

This will provide an output which is quite comparable to what is obtained with platinum, and it may attain 96 per cent or even more.

What we claim is:

1. Process for the preparation of sulphuric anhydride by contact, consisting in using as a catalytic mass grains of an inert and porous material, whose size varies from 2 to 5 mm. and impregnated with a solution of a vanadium salt in the proportion of 50 to 55 kg. of vanadic anhydride per cubic meter of the apparent volume of the mass, the grains being distributed in different layers traversed successively by the gases, the size of the grains being uniform in each layer and progressively decreasing in the series of layers so that the gases first pass to the layer containing the largest grains, while the last layer traversed by the gases is formed of the smallest grains.

2. A process as claimed in claim 1 in which the temperature is regulated by exchange as nearly perfectly as possible by means of any suitable apparatus.

3. In the process as claimed in claim 1, the addition of a small quantity of metallic oxides to the catalytic mass.

4. Process as claimed in claim 1, in which a part of the mixture of sulphurous anhydride and air is slightly moistened before it is passed over the catalytic mass.

5. Process as claimed in claim 1, in which the reaction is started by passing the gas through a layer of a platinum catalytic mass.

In witness whereof we have hereunto set our hands.

PAUL AUDIANNE.
GABRIEL BACHALARD.